(12) United States Patent
Aloisio et al.

(10) Patent No.: US 6,576,165 B2
(45) Date of Patent: Jun. 10, 2003

(54) OPTICAL FIBER CONNECTORS

(75) Inventors: Charles Joseph Aloisio, Atlanta, GA (US); Ray R. Cammons, Woodstock, GA (US)

(73) Assignee: Fitel USA Corp., Norcross, GA (US)

( * ) Notice: Subject to any disclaimer, the term of this patent is extended or adjusted under 35 U.S.C. 154(b) by 207 days.

(21) Appl. No.: 09/748,321

(22) Filed: Dec. 22, 2000

(65) Prior Publication Data

US 2002/0113329 A1 Aug. 22, 2002

(51) Int. Cl.[7] ............................................. B29D 11/00

(52) U.S. Cl. ...................................... 264/1.25; 264/230

(58) Field of Search ............................ 264/1.24, 1.25, 264/230; 156/304.1, 304.2

(56) References Cited

U.S. PATENT DOCUMENTS

| | | | | |
|---|---|---|---|---|
| 3,899,807 A | * | 8/1975 | Sovish et al. | 264/230 |
| 4,902,095 A | * | 2/1990 | Baker et al. | |
| 4,921,323 A | * | 5/1990 | Delahanty et al. | |
| 6,156,842 A | * | 12/2000 | Hoenig et al. | |

* cited by examiner

Primary Examiner—Mathieu D. Vargot
(74) Attorney, Agent, or Firm—Peter V. D. Wilde

(57) ABSTRACT

The specification describes a connector for joining optical elements, especially optical fibers. The connector is a sleeve made of a Simple Shaped Memory Polymer (SSMP) into which the optical fiber is inserted and the sleeve heated to collapse the sleeve around the optical fiber. The SSMP materials are not crosslinked and can be manufactured by a variety of techniques including extrusion. Various methods for forming the bore of the connector and expanding the size of the bore from the memory state to the metastable state are described.

11 Claims, 5 Drawing Sheets

OPTICAL FIBER CONNECTORS

FIELD OF THE INVENTION

This invention relates to a polymeric sleeve for connecting and/or clamping optical fibers.

BACKGROUND OF THE INVENTION

Optical fiber connectors that comprise shape memory polymers are known. See U.S. Pat. No. 4,921,323, of Delahanty et al. issued May 1, 1990. In its simplest form, this type of splice connector is a sleeve into which the ends of two fibers are inserted. The sleeve material comprises a shape memory polymer so that when the sleeve is heated, after insertion of the fibers, the sleeve shrinks and effects a splice between the fiber ends. These connectors have several advantages. They are simple and should be relatively inexpensive to manufacture. They are easy to use, and splices can be made quickly and reliably in the field.

The shape memory materials of the prior art are polymers that have some degree of crosslinking. Connector sleeves of these materials are molded with a small bore, smaller than the optical fiber size. The bore is then stretched to a diameter larger than the optical fiber, which creates a semi-permanent condition in the polymer whereby the bore in the polymer sleeve retains the large diameter when the mandrel is removed. This is a metastable state, since the polymer "remembers", and prefers, the shape in which is was molded. However, as long as the sleeve is maintained below its $T_S$ it remains in the metastable shape. When the splice is to be made, the optical fibers ends are inserted into the large bore, and the sleeve is heated to shrink the polymer to its molded (memory) shape, thereby gripping the fiber ends and completing the splice. In some cases, heat may be applied to facilitate the stretching step.

Known shape memory polymer materials for optical fiber splice applications are crosslinked polymers. As described in the Delahanty et al. patent references above, they require a minimum crosslinking density to be effective.

STATEMENT OF THE INVENTION

We have developed a new class of shape memory materials for optical fiber connector applications. This development follows our finding that non-crosslinked polymers function very effectively as shape memory materials. We have designated this class of materials as Simple Shape Memory Polymers (SSMP). Among the advantages of SSMP materials are that the choice of polymers for optical fiber system applications is expanded. Also expanded are the technologies available for manufacturing the connectors. For example, simple extrusion or injection molding techniques can be employed. Moreover, new approaches to the fabrication of optical fiber splices and other connector elements have been developed for use with this new category of materials.

DETAILED DESCRIPTION

Figure 1:
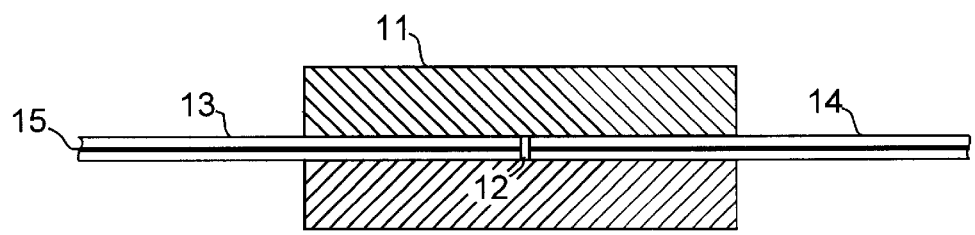
FIG. 1 is a simple optical fiber splice using the SSMP materials of the invention.

An SSMP optical fiber splice connector is shown in FIG. 1. The splice connector comprises SSMP sleeve 11 with a center bore 12 for the optical fibers 13 and 14. Reference number 15 denotes the core of the optical fiber. The optical fibers are typically stripped of fiber coating prior to insertion into the splice sleeve. FIG. 1 shows the completed SSMP splice after insertion of the optical fibers, and after heating to shrink the SSMP onto the fiber ends. It should be understood that this figure, as well as the figures that follow, are not necessarily drawn to scale. For example, the bore in the SSMP splice is exaggerated for clarity.

An important potential advantage of using SSMP materials for the splice body is that SSMP materials can be injection molded. The preform for the splice body shown in FIG. 1 can be injection molded using commercially available equipment to result in an elongated body with the desired initial center bore. This initial center bore is smaller, e.g. 2–10 microns smaller, than the OD of the optical fiber. Splice body preforms may also be extruded or molded as individual splice elements, or may be produced by extruding a continuous length of material which may then be cut into individual splice body preforms.

Figure 2:
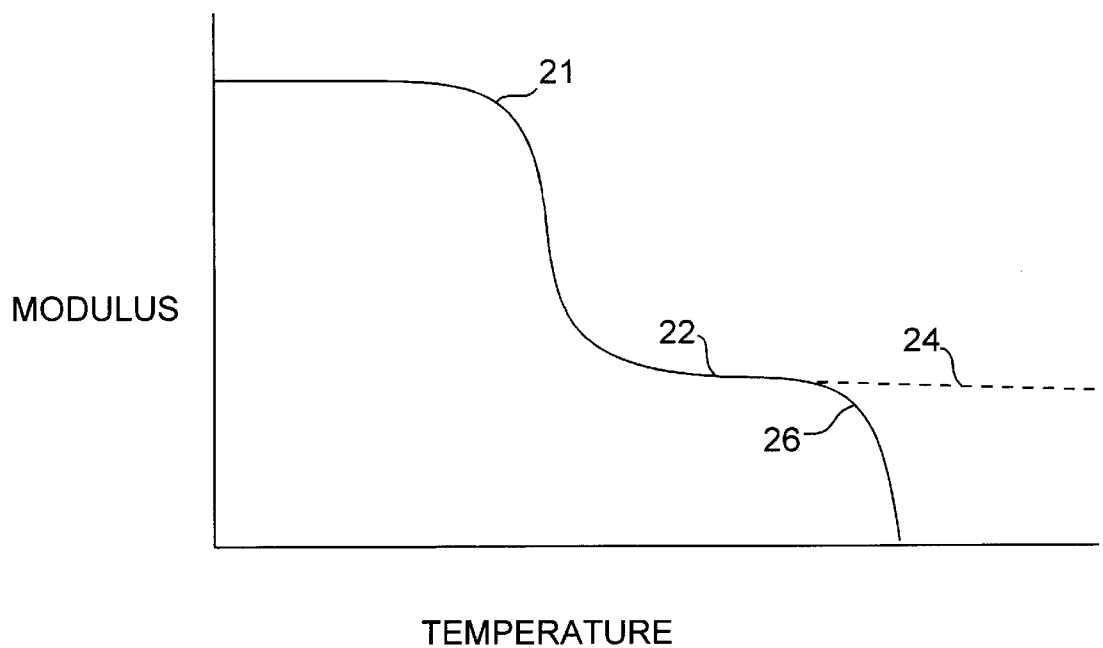
FIG. 2 is a schematic plot illustrating viscoelastic temperature transitions for SSMP materials.

The SSMP materials of the invention are characterized by a viscoelastic behavior with temperature that has two transitions. FIG. 2 is a plot of temperature vs. elastic modulus to illustrate the thermal behavior of typical SSMP materials. It shows a first transition, indicated at 21, where the polymer softens significantly. This transition point is commonly referred to as the softening temperature $T_S$ of the polymer. In non-crystalline polymers, this temperature is referred to as the glass transition temperature $T_g$. The modulus reaches a plateau, indicated at 22, where the modulus levels off. In typical crosslinked polymers, this plateau extends indefinitely, as indicated by dashed line 24. However, in the SSMP materials of the invention, a second transition is seen at 26. The viscoelastic point at which this transition begins is referred to as $T_F$, i.e. the onset of the flow region. The plateau between the first transition, $T_S$, and the second transition, $T_F$, is important to allow processing the SSMP material into the metastable state. For adequate processing latitude it is preferred that the plateau, which may be defined as a region with a slope of less than 0.2, extend for at least 10° C. For the purpose of the invention this characteristic may be used to define SSMP materials and distinguish them from conventional heat shrink materials. According to "Encyclopedia of Chemistry," 3rd Edition, Hampel and Hawley, Van Nostrand, uncrosslinked polymers such as nylon, polyethylene, or unvulcanized rubber normally consists of an aggregate of large molecules which, although they may interact with one another in the bulk are nevertheless independent of each other in the sense that no molecule is tied to any of the other by primary valence bonds.

SSMP polymers are also characterized in that an SSMP polymer will always have a solvent in which it can be dissolved without any significant amount of gel remaining.

The steps used to manufacture a SSMP splice sleeve of the kind shown in FIG. 1 will be described in conjunction with FIGS. 3–7.

Figure 3:
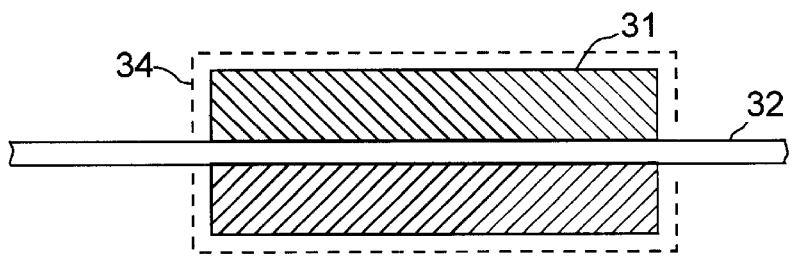
FIGS. 3–7 are schematic representations of process steps used for the manufacture of SSMP optical fiber splices.

With reference to FIG. 3, an SSMP splice body preform 31 is molded around wire mandrel 32 as shown. The mold is represented by 34 and is a conventional injection mold. The wire 32 may be of any suitable material such as stainless steel or gage wire.

Figure 4:
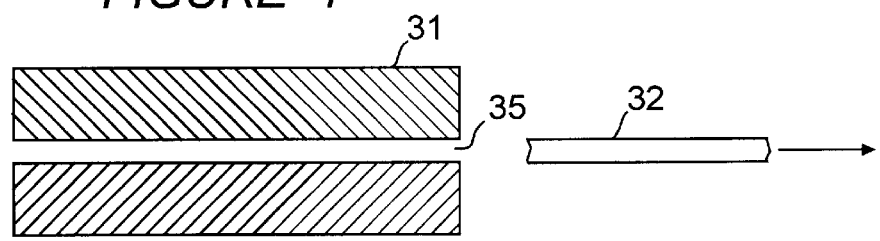

After molding and cooling the splice body 31, the wire is removed from the splice body as indicated in FIG. 4. The bore 35, remaining after removal of the wire, has a diameter less than the optical fiber diameter. Conventional optical fiber (stripped) has a diameter of approximately 125 microns, and the diameter of bore 35 is preferably made 2–20 microns smaller, i.e. 115–123 microns. Expressed in more general terms, it is preferred that the initial bore in the splice body preform as molded be 2–20% less than diameter of the elements to be joined.

Using the SSMP materials of the invention, the wire may simply be drawn from the molded splice body preform using moderate tensile force. The splice body preform in FIG. 4, after removal of the wire, is in the "memory" state of the polymer. Due to the plateau 22 in FIG. 2 the splice body prefers to be in this state, and "remembers" the initial bore diameter. The memory state is in contrast with the metastable state to be described in conjunction with FIG. 5.

Figure 5:
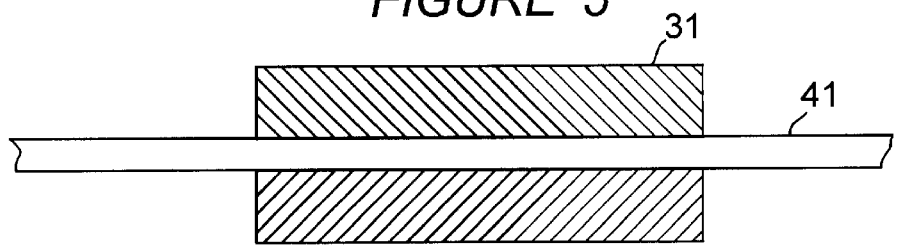

The initial bore 35 is then enlarged to form the metastable splice body by inserting a second mandrel, having the desired larger diameter, into the initial bore. In FIG. 5 the second mandrel is shown at 41. The polymer can be easily deformed and forced to the viscoelastic plateau 22 (FIG. 2) thereby placing the polymer sleeve in the aforementioned metastable condition, which in this case is an expanded bore corresponding to the diameter of mandrel 41. Stretching the polymer sleeve to the metastable state is referred to here as "conditioning".

Figure 6:
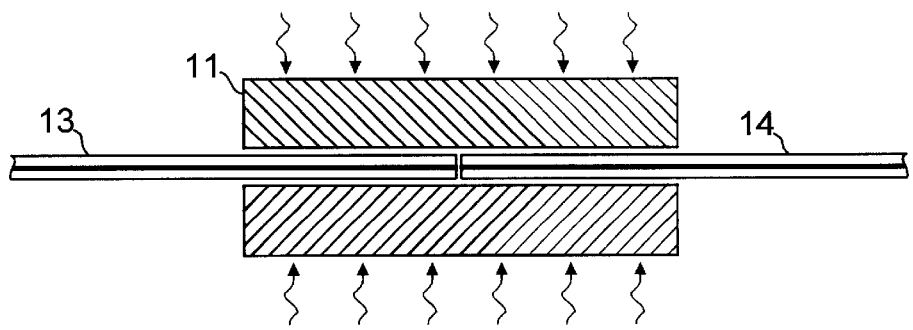
Figure 7:
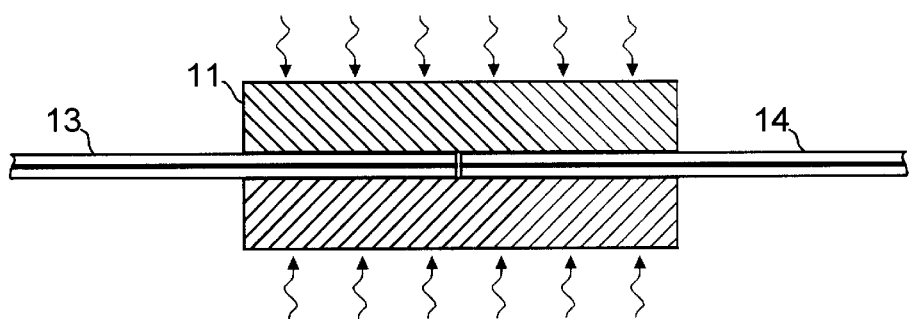

With the bore of the splice body temporarily enlarged by the conditioning step, the elements to be joined, in this case optical fibers 13 and 14, are inserted into the enlarged bore. Heat is then applied to the SSMP splice body as shown in FIG. 6 which causes the bore to collapse from the metastable size to the memory size and, as shown in FIG. 7, firmly grip the ends of the optical fibers.

Heat for the collapse step may be applied using, for example, a conventional furnace, an RTA apparatus, or a laser. Splices made in the field may employ a simple portable heat source, e.g. an infra red lamp. As pointed out earlier, the SSMP materials suitable for use in the invention are polymers with essentially no cross-linking. In addition, the molecular weight of an uncrosslinked SSMP polymer should be greater than the entanglement molecular weight $M_E$. Molecular theory and experimental evidence indicate that the SSMP materials of the invention should have a molecular weight greater than 40,000. On the same basis, the $T_S$ of the polymer should be greater than 80° C.

Suitable examples are:

| Material | $T_s$, ° C. | $M_E$ |
|---|---|---|
| Polymethylmethacrylate | 105 | 27,500 |
| Polystyrene | 97 | 31,200 |

After stretching the splice sleeves to the metastable condition, and inserting the element to be joined, the splice sleeve is heated to above 105° C. for polymethylmethacrylate sleeves, or above 97° C. for polystyrene sleeves, to collapse the polymer around the element and effect the connection.

Figure 8:
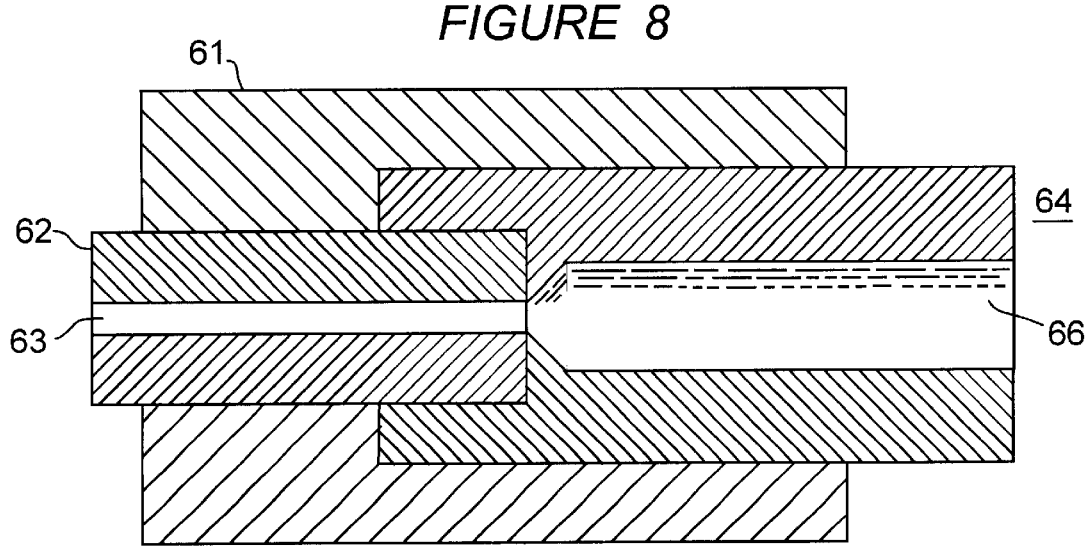
FIGS. 8 and 9 illustrate other connector applications for SSMP materials.

The description of the invention so far has been in terms of splicing optical fibers together using a simple SSMP sleeve. The invention may also be applied to joining other elements, typically optical waveguide elements. For example, it is also applicable to attaching optical fibers or other optical waveguides to photonic components such as lasers, modulators or detectors. An example of this kind of application is illustrated in FIG. 8, where an SSMP sleeve 61 is used to join a ferrule 62 to an optical waveguide such as optical fiber pigtail 64. The optical fiber pigtail may be attached to another optical fiber, or it may be attached to a photonic assembly such as a source or detector. Ferrules are typically ceramic but may also be made of polymer materials. The ferrule 62 has a center bore 63 for the optical fiber (not shown). The ferrule is adapted for insertion into terminal member 64 which has a center bore 66 for the mating fiber. To accommodate a coated fiber, bore 66 in the terminal member 64 may be larger than bore 63 in the ferrule 62. Examples of these types of connectors are described in U.S. Pat. Nos. 4,850,670; 5,396,572; 5,295,213 and 4,812,009.

Figure 9:
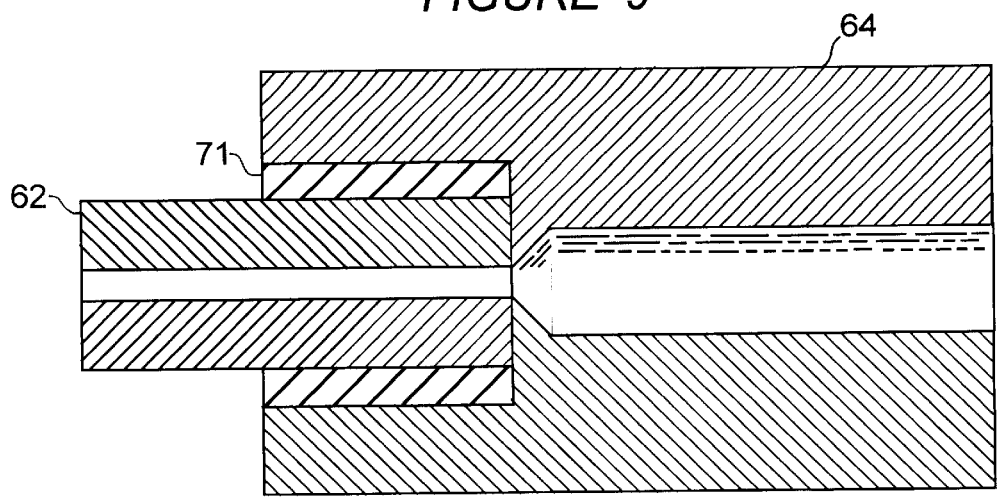

The embodiments of SSMP connectors represented by FIGS. 1 and 8 are "outside" or sleeve connectors, where the SSMP material is provided with an internal bore, and the members being joined are inserted into that bore. Other applications will arise wherein the SSMP material is employed as an adhesive member, used to affix the outside of a solid cylindrical, or tubular, member to the inside of a tubular member. In this application it may be advantageous to condition the SSMP element by shaping both the inside bore and the outside diameter. This may be done conveniently by compressing the outer surface of the SSMP sleeve while reshaping the inner bore. FIG. 9 illustrates this embodiment of the invention. In FIG. 9, ferrule 62 is joined to terminal member 64 with a sleeve insert 71 of SSMP material. The SSMP sleeve is conditioned so as to be easily inserted into the space between the outside diameter of the ferrule and the inside diameter of the terminal member. The conditioning step involves expanding the inner diameter of sleeve insert 71 as described above. It may alternatively or additionally involve compressing the outside of the sleeve insert. When the sleeve insert is expanded by heating to its memory state, it tightly joins the ferrule 62 to the terminal member 64.

Figure 10:
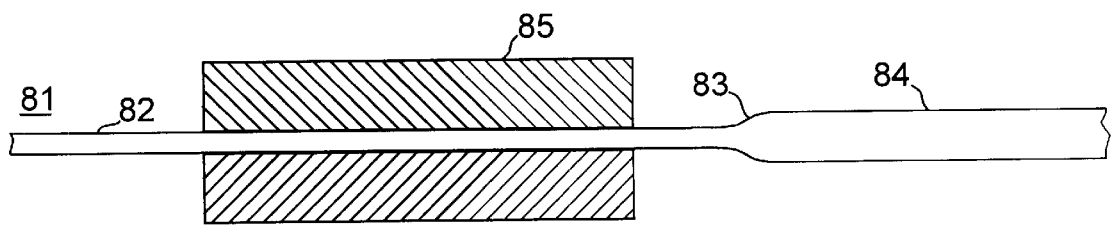
FIGS. 10–12 are schematic representations of a technique for conditioning SSMP connector elements.
Figure 11:
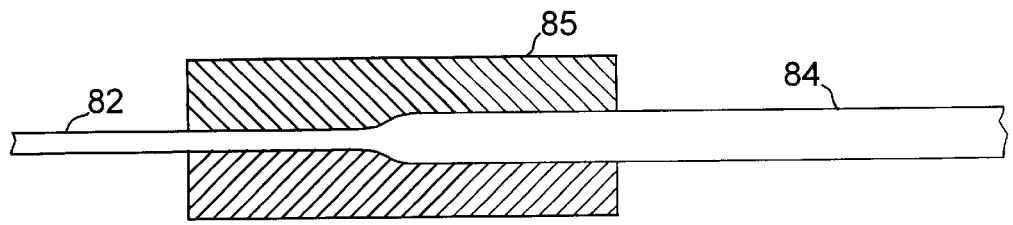
Figure 12:
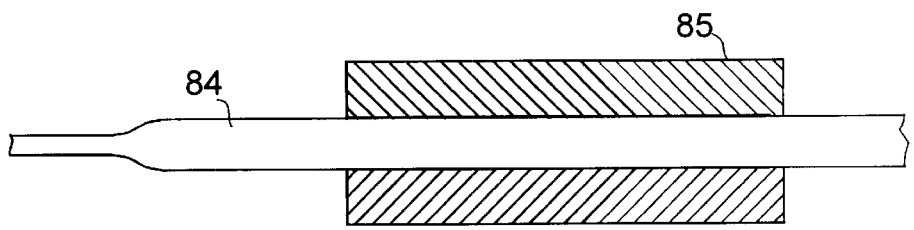

A convenient technique for expanding the bore of an SSMP connector member to convert the member from the as molded, or memory, state to the metastable, or conditioned, state will be described in conjunction with FIGS. 10–12. The main feature of this technique is the use of a tapered mandrel. FIG. 10 shows a mandrel, indicated generally at 81, with a first portion 82 having a first diameter, a tapered section 83 leading to a second portion of the mandrel 84 having a second, relatively larger, diameter. The splice body 85 is molded using the first, relatively small diameter, portion of the mandrel to form the memory bore. The splice body is stretched to freeze the memory shape of the memory bore in the SSMP material. The mandrel and splice body are then moved relative to each other to traverse the memory bore with the tapered section 83 of the tapered mandrel, as shown in FIG. 11, and the draw the relatively larger diameter portion 84 of the tapered mandrel into the bore of the splice body, as shown in FIG. 12, to condition the splice body to the conditioned state. The advantage of this technique is evident. The splice body can be molded, cooled, and conditioned in one continuous operation. In a manufacturing environment, a multi compartment mold may be used, and a large batch of connectors processed at one time.

Figure 13:
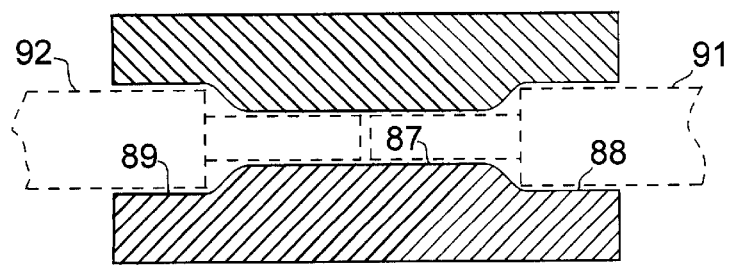
FIG. 13 is an alternative optical splice connector configuration.
Figure 14:
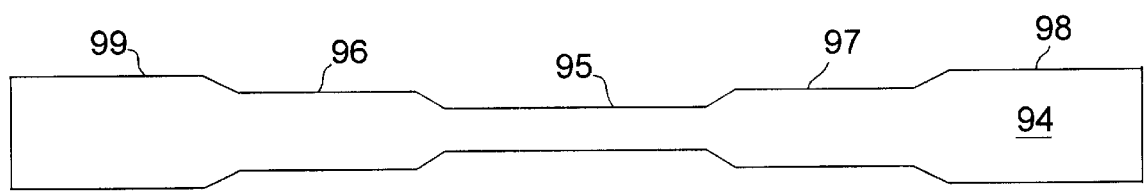
FIG. 14 represents a technique useful for the manufacture of the optical splice of FIG. 13.

Another alternative embodiment of the invention is represented by FIG. 13, in which the splice body is configured to provide a first sleeve portion 87 for the stripped portion of the optical fibers and a second sleeve portion 88 and 89 to accommodate a coated portion of the optical fibers. This structure, which may have a taper between these sections, has the advantage of easy insertion of the fiber ends into the connector, and also of forming a gripping region between polymers (the SSMP polymer and the optical fiber coating polymer). Optical fibers 91 and 92 are shown in phantom. This splice body structure is somewhat more complex to fabricate than the splice body of FIG. 1, with a single diameter bore. However, a convenient method for making this structure, which is an extension of the technique just described, is to use a mandrel with three sections. FIG. 14 shows this approach schematically. The Figure shows a mandrel 94, with a middle portion 95 for molding the splice body, second sections 96, 97 for conditioning the first bore section (87 of FIG. 13) and third portions 98, 99, for conditioning the second bore sections (88, 89 of FIG. 13). It may be evident at this point that this mandrel cannot be pulled from one end through the splice body as before, but is pulled first from the right side of the drawing (or the splice body moved to the left), to form the inner bore section 87 and the bore section 89. Then the mandrel is moved to the left of the drawing (or the splice body moved to the right) to form the bore section 88. Again, in a manufacturing environment this operation would be conducted on a large batch of splice bodies using a number a mandrels operating together. It may be evident to those skilled in the art that one or the other of sections 96 and 97 may be omitted and still achieve the bore expansion desired. However, the presence of both sections aids in the concentric alignment of sleeve sections 88 and 89 (FIG. 13) with bore section 87.

A significant advantage of the foregoing method is that the three bores, the inner bore 87, and the two bore sections 88 and 89, are all precisely aligned. This is a consequence of forming all three bores using the same mandrel.

Reference herein to splice bodies refers to SSMP bodies with a sleeve shape into which typically at least one optical fiber is inserted and joined to another optical fiber or to an optical element. However, as indicated by FIGS. 8 and 9, the SSMP bodies of the invention may be used to connect two optical elements in a connector arrangement not typically referred to as a splice. Accordingly, a more suitable term for the broad application of the invention is connector body, which refers to a body of SSMP material with a bore for insertion of an optical fiber or other element for the purpose of joining that optical fiber or element to another element.

While the foregoing description teaches joining optical fibers and other optical elements, the techniques described may also prove useful for joining/gripping other kinds of fibers.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A method for the manufacture of a polymer connector the polymer connector comprising a simple shaped memory polymer (SSMP) having an elastic modulus M, a softening temperature $T_S$ and a flow region temperature $T_F$, the polymer connector made by the steps of:
   a) molding a polymer connector body around a first section of a mandrel to form a bore through the connector body, the mandrel having:
      i. a first section with a diameter $D_1$,
      ii. a second section adjacent the first section with a diameter $D_2$, and
      iii. a third section adjacent the second section with a diameter $D_3$,
   b) moving the second section of the mandrel through the bore,
   c) moving the third section of the mandrel through a portion of the bore,
   d) removing the mandrel from the connector body leaving a bore with a first portion having diameter $D_2$ and a section portion with a diameter $D_3$.

2. The method of claim 1 wherein the SSMP has a relationship M vs. $T_S$ and $T_F$ where the slope of the modulus has as a region with a slope of less than 0.2 between $T_S$ and $T_F$.

3. The method of claim 2 wherein said region extends for at least 10° C.

4. The method of claim 2 wherein the mandrel is a metal wire and the first section is tapered into the second section, and the second section is tapered into the third section.

5. A method for the manufacture of a polymer connector comprising a simple shaped memory polymer (SSMP) having an elastic modulus M, a softening temperature $T_S$ and a flow region temperature $T_F$, the polymer connector made by the steps of:
   a) molding a polymer connector body around a first section of a mandrel to form a bore through the connector body, the mandrel having:
      i. a first section with a diameter $D_1$, and
      ii. a second section adjacent the first section with a diameter $D_2$,
   b) moving the second section of the mandrel through the bore,
   c) removing the mandrel from the connector body leaving a bore having diameter $D_2$.

6. The method of claim 5 wherein the SSMP has a relationship M vs. $T_S$ and $T_F$ where the slope of the modulus has as a region with a slope of less than 0.2 between $T_S$ and $T_F$.

7. The method of claim 6 wherein said region extends for at least 10° C.

8. The method of claim 6 wherein the mandrel is a metal wire having a first section with diameter $D_1$ tapered into a second section with diameter $D_2$.

9. A method for the manufacture of a polymer connector the polymer connector comprising a simple shaped memory polymer (SSMP) having an elastic modulus M, a softening temperature $T_S$ and a flow region temperature $T_F$, the polymer connector made by the steps of:
   a) molding a polymer connector body around a first section of a mandrel to form a bore through the connector body, the mandrel having:
      i. a first section with a diameter $D_1$,
      ii. a second section adjacent the first section with a diameter $D_2$, and
      iii. a third section adjacent the second section with a diameter $D_3$,
   b) moving the second section of the mandrel through the bore,
   c) moving the third section of the mandrel through a portion of the bore,
   d) removing the mandrel from the connector body leaving a bore with a first portion having diameter $D_2$ and a section portion with a diameter $D_3$.

10. The method of claim 9 wherein the SSMP has a relationship M vs. $T_S$ and $T_F$ where the slope of the modulus has as a region with a slope of less than 0.2 between $T_S$ and $T_F$.

11. The method of claim 10 wherein said region extends for at least 10° C.

* * * * *